(12) United States Patent
Sarawate et al.

(10) Patent No.: US 10,934,873 B2
(45) Date of Patent: Mar. 2, 2021

(54) SEALING SYSTEM FOR TURBINE SHROUD SEGMENTS

(71) Applicant: General Electric Company, Schenectady, NY (US)

(72) Inventors: Neelesh Nandkumar Sarawate, Niskayuna, NY (US); Christopher Edward Wolfe, Niskayuna, NY (US); John Patrick Pollinger, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 16/182,727

(22) Filed: Nov. 7, 2018

(65) Prior Publication Data

US 2020/0141254 A1 May 7, 2020

(51) Int. Cl.
*F01D 11/00* (2006.01)
*F01D 25/26* (2006.01)
*F01D 9/04* (2006.01)

(52) U.S. Cl.
CPC .............. *F01D 11/005* (2013.01); *F01D 9/04* (2013.01); *F01D 25/26* (2013.01); *F05D 2220/32* (2013.01); *F05D 2240/128* (2013.01); *F05D 2240/55* (2013.01)

(58) Field of Classification Search
CPC ........................... F01D 11/005; F05D 2240/11
See application file for complete search history.

(56) References Cited

U.S. PATENT DOCUMENTS

| | | | |
|---|---|---|---|
| 6,893,214 B2 * | 5/2005 | Alford | F01D 9/04 415/138 |
| 6,997,673 B2 * | 2/2006 | Morris | F01D 9/04 415/1 |
| 7,238,002 B2 | 7/2007 | Cairo et al. | |
| 7,374,395 B2 | 5/2008 | Durocher et al. | |
| 8,206,092 B2 | 6/2012 | Tholen et al. | |
| 8,684,680 B2 | 4/2014 | Martin et al. | |
| 8,740,552 B2 | 6/2014 | Marusko et al. | |
| 8,753,073 B2 | 6/2014 | Albers et al. | |
| 8,905,709 B2 | 12/2014 | Dziech et al. | |
| 9,759,079 B2 * | 9/2017 | Sippel | F01D 25/26 |
| 9,869,194 B2 | 1/2018 | Dev et al. | |
| 9,869,201 B2 | 1/2018 | Dyson et al. | |
| 9,874,104 B2 | 1/2018 | Shapiro | |
| 10,100,660 B2 | 10/2018 | Sippel et al. | |

(Continued)

OTHER PUBLICATIONS

Maradia, Umang, et al., "Efficient machining of complex-shaped seal slots for turbomachinery," CIRP Annals—Manufacturing Technology, 2018, pp. 209-212, vol. 67, Issue: 1, Switzerland.

*Primary Examiner* — Eldon T Brockman
(74) *Attorney, Agent, or Firm* — Dority & Manning, P.A.

(57) ABSTRACT

A turbine shroud is disposed between stages of stationary turbine nozzles. The turbine shroud includes arcuate shroud segments sealingly engaged with one another. Each shroud segment includes a bottom panel with a radially inner surface and a radially outer surface and opposite ends. Each end includes an end face, an end cutback face spaced from the end face, and an intermediate surface extending between the end face and the end cutback face to define a recess. One or more seals overlap the recess of a circumferentially adjacent pair of shroud segments to produce a sealed joint.

19 Claims, 10 Drawing Sheets

(56) References Cited

U.S. PATENT DOCUMENTS

| | | | |
|---|---|---|---|
| 10,584,605 B2* | 3/2020 | Sippel | F01D 11/008 |
| 10,704,404 B2* | 7/2020 | Shi | F01D 25/145 |
| 10,718,226 B2* | 7/2020 | Vetters | F01D 25/005 |
| 2004/0041351 A1* | 3/2004 | Beeck | F01D 11/005 |
| | | | 277/503 |
| 2004/0120808 A1* | 6/2004 | Alford | F01D 9/04 |
| | | | 415/173.1 |
| 2005/0129499 A1* | 6/2005 | Morris | F01D 25/12 |
| | | | 415/1 |
| 2009/0324393 A1 | 12/2009 | Gonzalez et al. | |
| 2016/0312639 A1 | 10/2016 | Shapiro et al. | |
| 2018/0087394 A1 | 3/2018 | Sarawate et al. | |
| 2019/0153886 A1* | 5/2019 | Vetters | F01D 25/246 |

\* cited by examiner

SEALING SYSTEM FOR TURBINE SHROUD SEGMENTS

TECHNICAL FIELD

The present disclosure relates to a gas turbine engine and, more specifically, to segmented turbine shrouds and to systems for reducing leakage between adjacent shroud segments.

BACKGROUND

A typical gas turbine engine, as may be used to propel an aircraft, generally possesses a forward end and an aft end with its several core or propulsion components positioned axially therebetween. An air inlet, or intake, is located at a forward end of the engine. Moving toward the aft end, in order, the intake is followed by a fan, a compressor, a combustion chamber, and a turbine. It will be readily apparent to those skilled in the art that additional components may also be included in the engine, such as low-pressure and high-pressure compressors and low-pressure and high-pressure turbines. This, however, is not an exhaustive list.

The compressor and turbine generally include rows of airfoils that are stacked axially in stages. Each stage includes a row of circumferentially spaced stator vanes that are affixed to an outer casing and a row of rotor blades that rotate about a center shaft or axis of the turbine engine. A multi-stage, low-pressure turbine follows the multi-stage high-pressure turbine and is typically joined by a second shaft to a fan disposed upstream from the compressor in a typical turbo-fan aircraft engine configuration used for powering an aircraft in flight.

A typical gas turbine engine utilizes a high-pressure turbine and a low-pressure turbine to maximize extraction of energy from high temperature combustion gas.

The turbine section typically has an internal shaft axially disposed along a center longitudinal axis of the engine. The blades are circumferentially distributed on a rotor, causing rotation of the internal shaft. The internal shaft is connected to the rotor and the air compressor, such that the turbine provides a rotational input to the air compressor to drive the compressor blades. This powers the compressor during operation and subsequently drives the turbine. As the combustion gas flows downstream through the turbine stages, energy is extracted from the combustion gas, and the pressure of the combustion gas is reduced.

In operation, air is pressurized in a compressor and mixed with fuel in a combustor for generating hot combustion gases that flow downstream through turbine stages. These turbine stages extract energy from the combustion gases. A high-pressure turbine first receives the hot combustion gases from the combustor and includes a row of stator nozzles directing the combustion gases downstream through a row of high-pressure turbine rotor blades that extend radially outward from a supporting rotor disk. The stator nozzles turn the hot combustion gas in a manner to maximize extraction at the adjacent downstream turbine blades. In a two-stage turbine, a second row of stator nozzles is positioned downstream of the first stage blades, followed in turn by a row of second stage rotor blades that extend radially outwardly from a second supporting rotor disk. The turbine converts the combustion gas energy to mechanical energy.

During the operation of the gas turbine engine, it is desirable to minimize thermally induced deformation of the outer casing through the turbine section of the engine. In some cases, turbine shrouds are used to isolate the outer casing from heat produced by the hot combustion gases flowing through the turbine. The turbine shrouds are connected to the engine casing, via hangers, to provide an outer flow boundary for the combustion gas, which limits the high-temperature combustion gas from adversely affecting the casing. The shroud extends circumferentially to form a ring shape and may be formed of a plurality of circumferentially extending shroud segments.

The rotation of the turbine blade causes the combustion gas to move radially outward toward the turbine shrouds. If the combustion gas leaks through the joints between adjacent shroud segments, energy losses may occur, leading to sub-optimal performance of the gas turbine. To combat these leakages, multiple small seals are positioned between shroud segments (one of which is shown in FIG. 1) along the surfaces that abut adjacent shroud segments.

Figure 1:
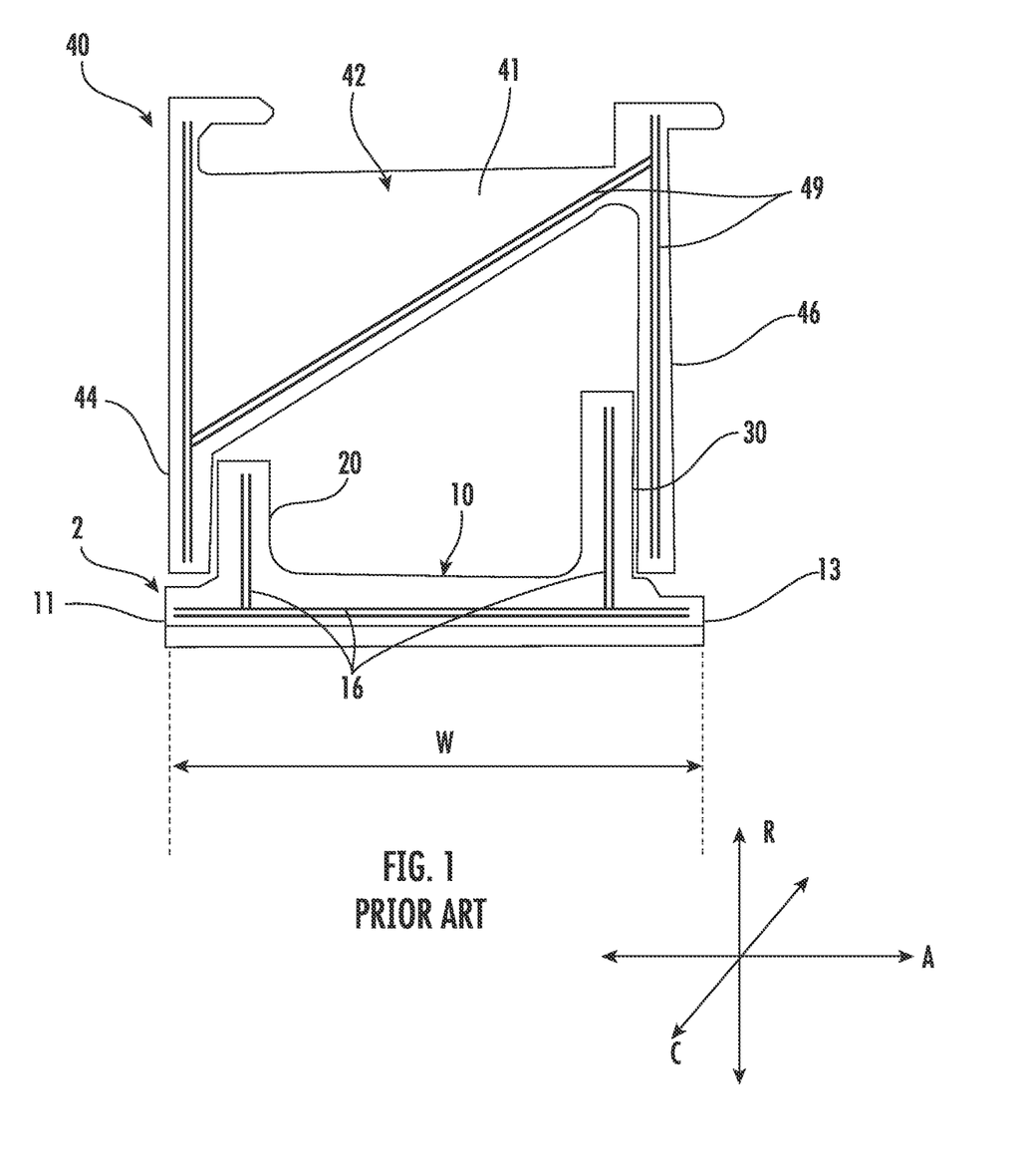
FIG. 1 is a cross-sectional view of a conventional turbine shroud segment mounted within a hanger.

FIG. 1 illustrates a conventional turbine shroud segment 2 as secured by a hanger 40. The hanger 40 includes a first hanger leg 44 and a second hanger leg 46, which are joined by a hanger body 42. The shroud segment 2 includes a centrally located bottom panel 10, which spans a width "W" in the axial direction between a first axial edge 11 and a second axial edge 13. A first leg 20 extends radially outward from the bottom panel 10 inboard of a first edge 11 of the bottom panel 10 and inboard of the first hanger leg 42. A second leg 30, which is parallel to the first leg 20, extends radially outward from the bottom panel 10 inboard of a second edge 13 of the bottom panel 10 and inboard of the second hanger leg 44. The first leg 20 is shorter than the second leg 30.

The circumferential end face 14 of the shroud segment 2 includes seal slots 16 within which individual seals are installed. The circumferential end face 41 of the hanger 40 includes additional seal slots 49 within which individual seals are installed. The seals (not shown) are typically thin metal strips that are inserted individually between each shroud segment as the shroud segments are installed.

As may be imagined, it is often difficult to maintain the seals within the slots of a first shroud segment, while positioning the adjacent shroud segment. If one of the seals falls out, a technician must search for the displaced seal and re-install it. This is a time-consuming and tedious process, especially since some of the seals may be very short (around 1 inch). Moreover, because the seals are made of thin metal, they are prone to burn through at higher operating temperatures, which can negatively impact the durability of the turbine shroud as well as the performance of the gas turbine.

It would be desirable to overcome these and other deficiencies with improved turbine shroud segments for gas turbine engines. More specifically, it would be desirable to configure circumferentially adjacent shroud segments with one or more seals that are more easily installed between these shroud segments.

SUMMARY

According to a first aspect of the present disclosure, a turbine shroud is disposed between adjacent stages of stationary turbine nozzles. The turbine shroud includes a plurality of arcuate shroud segments sealingly engaged with one another. Each arcuate shroud segment includes a bottom panel, which has a radially inner surface, a radially outer surface, a first end, and a second end. The first end includes a first end face extending radially outward from the radially inner surface of the bottom panel, a first end cutback face circumferentially spaced from the first end face and extending radially inward from the radially outer surface of the bottom panel, and a first intermediate surface extending between the first end face and the first end cutback face to define a first recess. The second end includes a second end face extending radially outward from the radially inner surface of the bottom panel, a second end cutback face circumferentially spaced from the second end face and extending radially inward from the radially outer surface of the bottom panel, and a second intermediate surface extending between the second end face and the second end cutback face to define a second recess. The turbine shroud further includes a plurality of seals, wherein at least one seal is disposed within the first recess and the second recess of each respective pair of adjacent arcuate shroud segments of the plurality of arcuate shroud segments.

According to another aspect of the present disclosure, a turbine engine includes a rotor comprising a plurality of stationary nozzles arranged in a first stage and a second stage; and a shroud disposed between the first stage and the second stage of the plurality of stationary nozzles. The turbine shroud includes a plurality of arcuate shroud segments sealingly engaged with one another. Each arcuate shroud segment includes a bottom panel, which has a radially inner surface, a radially outer surface, a first end, and a second end. The first end includes a first end face extending radially outward from the radially inner surface of the bottom panel, a first end cutback face circumferentially spaced from the first end face and extending radially inward from the radially outer surface of the bottom panel, and a first intermediate surface extending between the first end face and the first end cutback face to define a first recess. The second end includes a second end face extending radially outward from the radially inner surface of the bottom panel, a second end cutback face circumferentially spaced from the second end face and extending radially inward from the radially outer surface of the bottom panel, and a second intermediate surface extending between the second end face and the second end cutback face to define a second recess. The turbine shroud further includes a plurality of seals, wherein at least one seal is disposed within the first recess and the second recess of each respective pair of adjacent arcuate shroud segments of the plurality of arcuate shroud segments.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current turbine shroud segments, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The term "inner" is used to describe components in proximity to the turbine shaft, while the term "outer" is used to describe components distal to the turbine shaft.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of turbine shrouds for aviation-powering gas turbines for purposes of illustration, one of ordinary skill in the art will readily appreciate that embodiments of the present disclosure may be applied to land-based power-generating gas turbines and are not limited to turbine components for gas turbines in a particular field, unless specifically recited in the claims.

Figure 2:
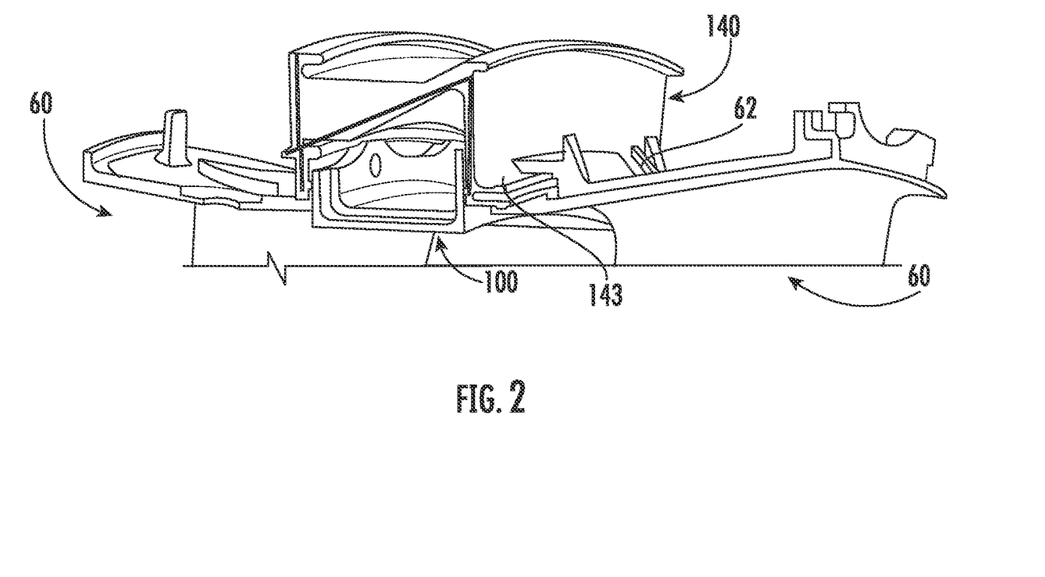
FIG. 2 is a perspective view of a turbine shroud segment, according to one aspect of the present disclosure, installed within a hanger between a pair of adjacent turbine nozzles.
Figure 3:
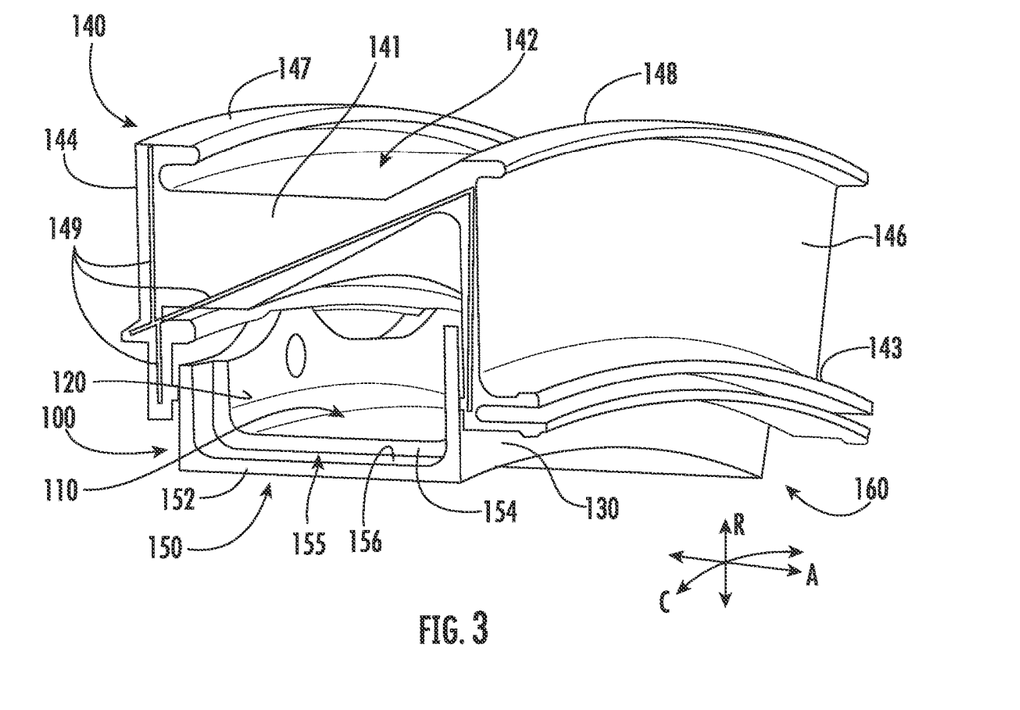
FIG. 3 is a perspective view of the turbine shroud segment and hanger of FIG. 2.

Referring now to the present turbine shroud segments, FIGS. 2 and 3 illustrate a turbine shroud segment 100, which is connected to a hanger 140. The hanger 140 includes a central hanger body 142 with a circumferential end face 141, a first hanger leg 144, and a second hanger leg 146 opposite the first hanger leg 144. The circumferential end face 141 and the respective end faces of the first hanger leg 144 and the second hanger leg 146 may be provided with seal slots 149, if so desired.

The hanger 140 mounts to the casing (not shown) by means of tabs 147, 148 and to adjacent stationary nozzles 60 by means of oppositely disposed ribs 143 that are surrounded by hooks 62 projecting from the surface of the stationary nozzles 60. The stationary nozzles 60 are representative of a plurality of circumferentially spaced stationary nozzles that are grouped in stages. It should be understood that the shroud made from the present shroud segments 100 (or 200) may be positioned between any pair of adjacent stages of stationary nozzles 60.

The turbine shroud segment 100 includes a bottom panel 110, a first leg 120 extending radially outward from the bottom panel 110 along the circumferential length of the shroud segment 100, and a second leg 130 extending radially outward from the bottom panel 110 along the circumferential length of the shroud segment 100 opposite the first leg 120. The intersection of the first leg 120 and the bottom panel 110 defines a first edge 111, and the intersection of the second leg 130 and the bottom panel 110 defines a second edge 113. The first leg 120 of the turbine shroud segment 100 may be shorter (i.e., extend in a radial direction over a shorter distance) than the second leg 130 of the shroud segment 100.

The first leg 120 and the second leg 130 may extend over a non-uniform length from the bottom panel 110. As illustrates in FIG. 4, the first leg 120 and the second leg 130 may have a wave pattern having crest areas 128 separated by trough areas 129. The first leg 120, which forms a side wall of the shroud segment 100, may include one or more holes 127 for rigidly fastening the shroud segment 100 to the hanger 140 (for example, using pins, bolts, or other mechanical fasteners, not shown). Similarly, the second leg 130, which forms a second side wall of the shroud segment 100, may include one or more holes 137 for rigidly fastening the shroud segment 100 to the hanger 140 (for example, using pins, bolts, or other mechanical fasteners, not shown). The holes 127, 137 may be located in the crest areas 128, 138.

Figure 4:
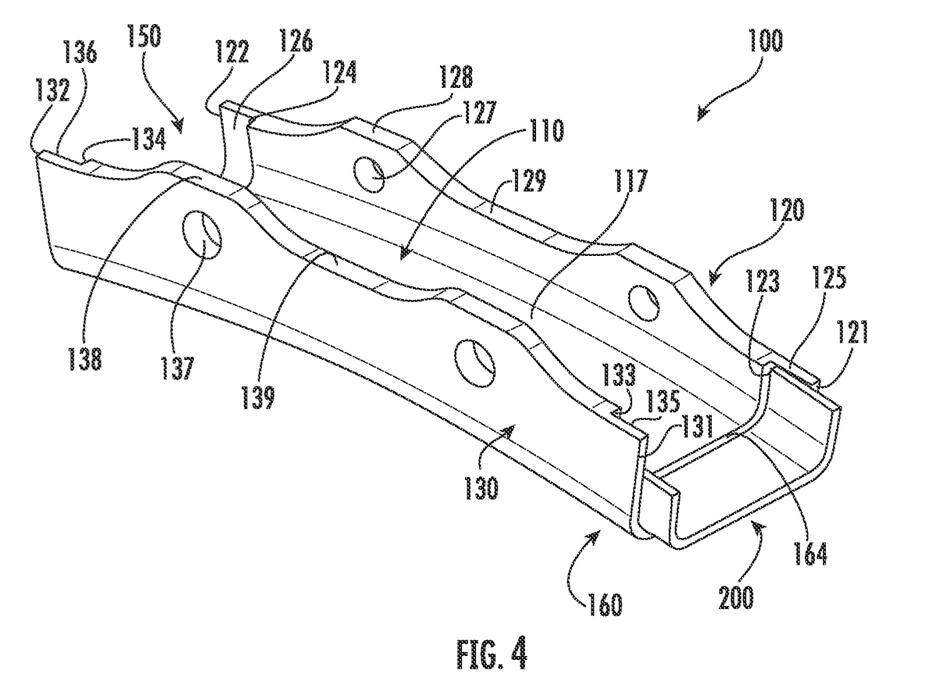
FIG. 4 is a perspective view of the turbine shroud segment of FIG. 2, as shown with an exemplary seal, according to one aspect of the present disclosure.
Figure 5:
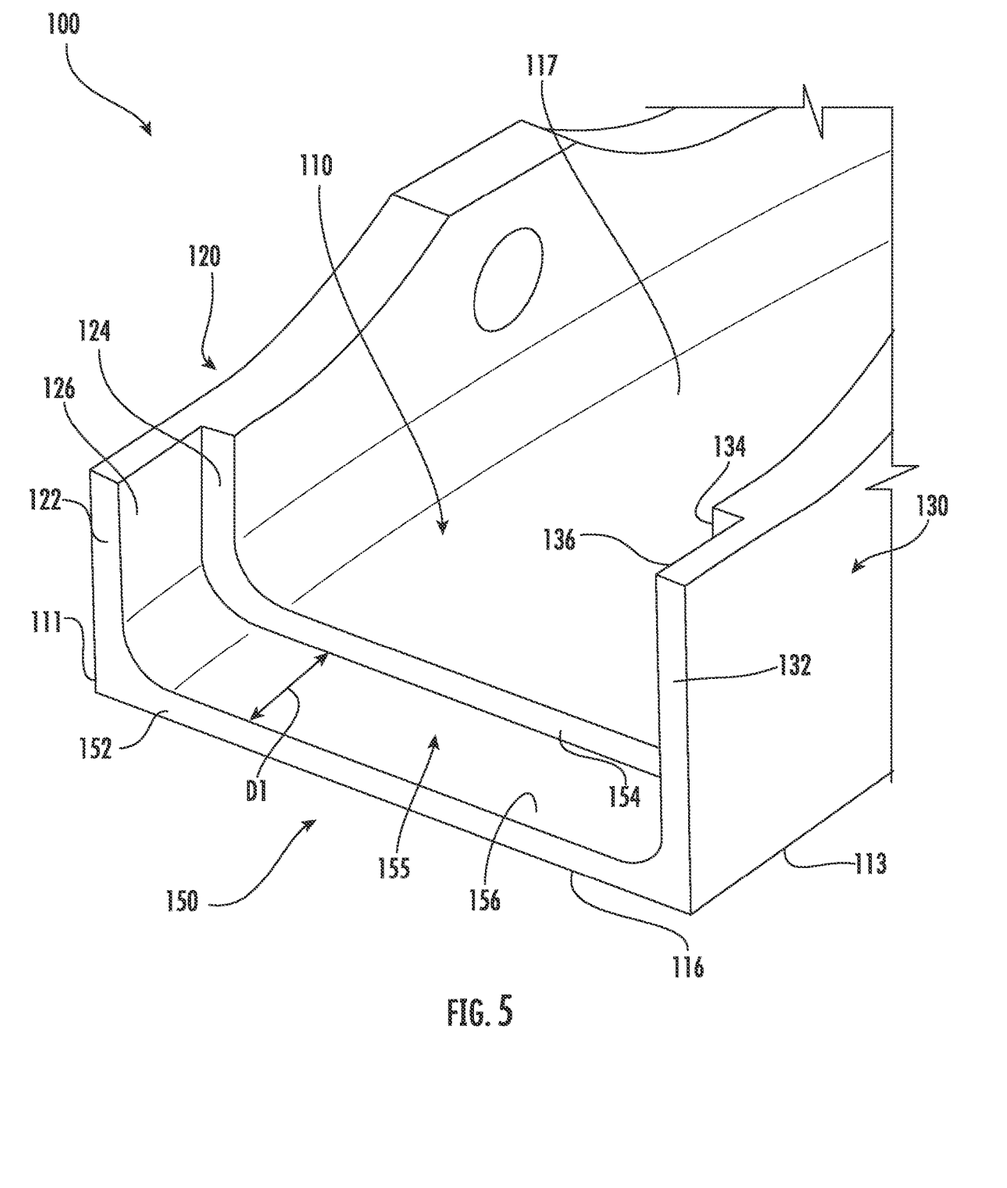
FIG. 5 is a perspective view of a first end of the turbine shroud segment of FIG. 2.
Figure 6:
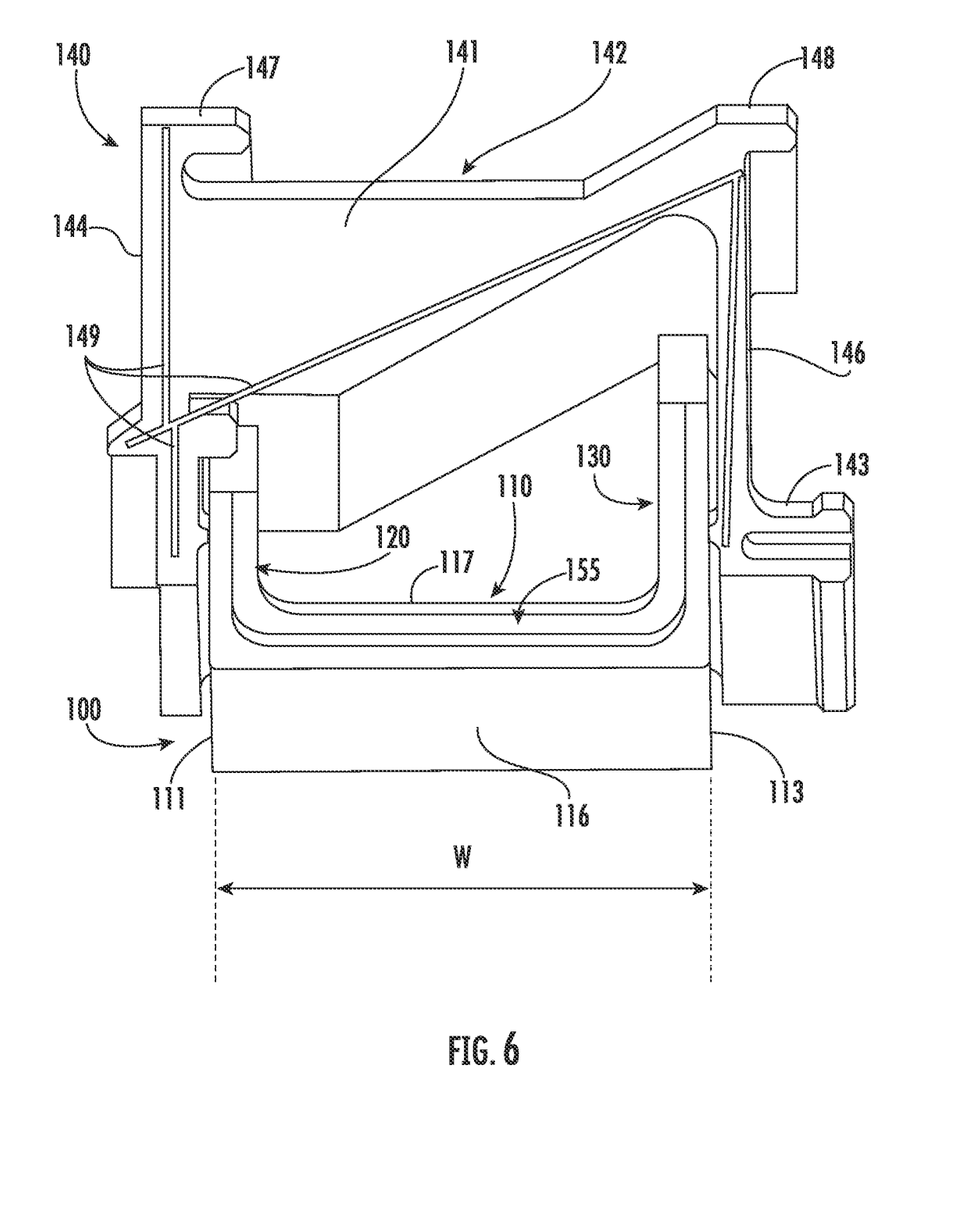
FIG. 6 is a perspective view of the turbine shroud segment and hanger of FIG. 2, as viewed from the first end.

The turbine shroud segment 100, shown in closer detail in FIGS. 4 through 6, includes a first end 150 and a second end 160 circumferentially spaced from the first end 150. The first end 150 of a first turbine shroud segment 100 is aligned with the second end 160 of an adjacent second turbine shroud segment 100, such that a seal 200 may be installed within the ends 150, 160 of the adjacent turbine shroud segments 100. Similarly, the second end 160 of the first turbine shroud segment 100 is aligned with the first end 150 of an adjacent third shroud segment 100, and so forth, until a complete shroud ring is defined.

As shown in FIGS. 4 and 5, the first end 150 includes a first end face 152, a first end cutback face 154 circumferentially spaced from the first end face 152, and an intermediate surface 156 extending between the first end face 152 and the first end cutback face 154 to define a recess 155 in the radially outer surface of the bottom panel 110. The first end face 152 extends radially outward from a radially inner (bottom) surface 116 of the bottom panel 110, and the first end cutback face 154 extends radially inward from the radially outer (top) surface 117 of the bottom panel 110. In the embodiment illustrated in FIGS. 4 and 5, the intermediate surface 156 is disposed at an equal distance between the radially inner surface 116 and the radially outer surface 117 of the bottom panel 110. The first end face 152 and the first end cutback face 154 are separated by a distance D1, which represents the circumferential width of the recess 155.

At the first end 150, the first leg 120 of the shroud segment 100 includes a first leg face 122, a first leg cutback face 124 spaced apart from the first leg face 122 in the circumferential direction, and a first leg intermediate surface 126 extending circumferentially between the first leg face 122 and the first leg cutback face 124. The second leg 130 of the shroud segment includes a second leg face 132, a second leg cutback face 134 spaced apart from the second leg face 132 in the circumferential direction, and a second leg intermediate surface 136 extending circumferentially between the second leg face 132 and the second leg cutback face 134.

The first leg face 122 and the second leg face 132 are integral with the first end face 152 of the bottom panel 110. The first leg cutback face 124 and the second leg cutback face 134 are integral with the first end cutback face 154 of the bottom panel 110. The first leg intermediate surface 126 and the second leg intermediate surface 136 are integral with the intermediate surface 156 of the bottom panel 110, thereby defining a U- or J-shaped channel. In the illustrated embodiment, the first leg intermediate surface 126 bisects the first leg 120 (that is, the first leg intermediate surface 126 is disposed at an equal distance in the axial direction between an outer surface of the first leg 120 and an inner surface of the first leg 120). Similarly, the second leg intermediate surface 136 bisects the second leg 130.

Figure 9:
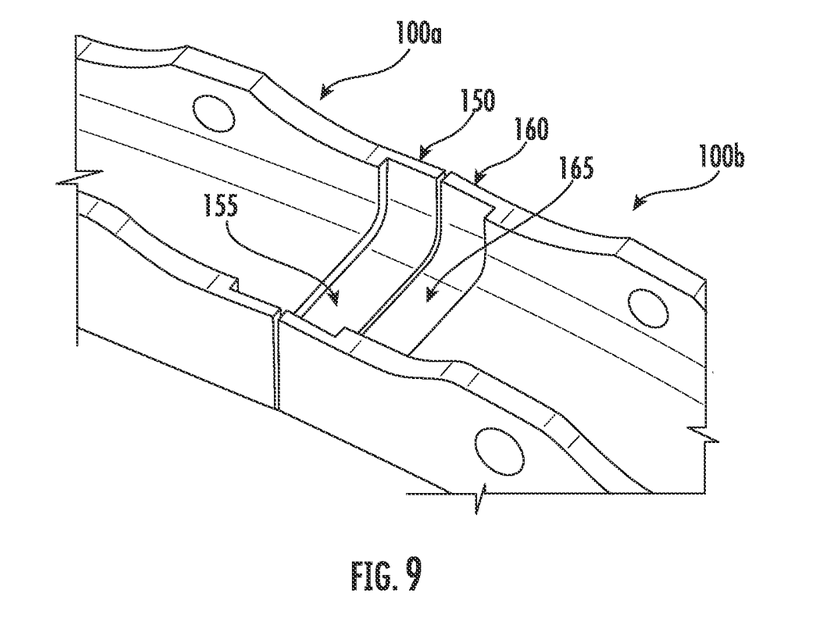
FIG. 9 is an overhead perspective view of a joint between a pair of turbine shroud segments aligned end-to-end.

The second end 160 is configured with a similar construction to define a recess 165 (shown in FIG. 9). At the second end 160, the first leg 120 of the shroud segment 100 includes a third leg face 121, a third leg cutback face 123 spaced apart from the third leg face 121 in the circumferential direction, and a third intermediate surface 125 extending circumferentially between the third leg face 121 and the third leg cutback face 123. The second leg 130 of the shroud segment includes a fourth leg face 131, a fourth leg cutback face 133 spaced apart from the fourth leg face 131 in the circumferential direction, and a fourth intermediate surface 135 extending circumferentially between the fourth leg face 131 and the fourth leg cutback face 133.

The third leg face 121 and the fourth leg face 131 are integral with the second end face (not shown) of the bottom panel 110. The third leg cutback face 123 and the fourth leg cutback face 133 are integral with a second end cutback face (not shown) of the bottom panel 110. The third intermediate surface 125 and the fourth intermediate surface 135 are integral with the recess 165 of the bottom panel 110, thereby defining a U- or J-shaped channel. In the illustrated embodiment, the first leg projecting surface 125 bisects the first leg 120 (that is, the first leg projecting surface 125 is disposed at an equal distance in the axial direction between an outer surface of the first leg 120 and an inner surface of the first leg 120). Similarly, the second leg projecting surface 135 bisects the second leg 130.

Although the end faces 152, 162; the end cutback faces 154, 165; the leg end faces 121, 122, 131, 132; and the leg cutback faces 123, 124, 133, 134 are illustrated as being parallel to a radial axis extending from the turbine rotor, it should be understood that faces may be oriented at some other angle, provided the mating surfaces of the first end 150 are angled in a complementary direction to the mating surfaces of the second end 160. An arrangement having one or more pairs of angled faces may further improve sealing properties by producing a more tortuous path for the hot combustion products.

As shown in FIG. 6, the first leg 120 of the turbine shroud segment 100 is disposed entirely inboard of the first leg 144 of the hanger 140, and the second leg 130 of the turbine shroud segment 100 is disposed entirely inboard of the second leg 146 of the hanger 140. Unlike the conventional turbine shroud segment 10 (shown in FIG. 1), the legs 120, 130 and/or the bottom panel 110 of the turbine shroud segment 100 do not extend axially beneath the legs 144, 146 of the hanger 140, but instead are wholly contained (in the axial direction) within the hanger 140. The axial width W of the turbine shroud segment 100 is equivalent to the width W of a conventional shroud segment 10, so that the present turbine shroud segments 100 may be retrofit into the hangers 140 of existing turbines.

Figure 7:
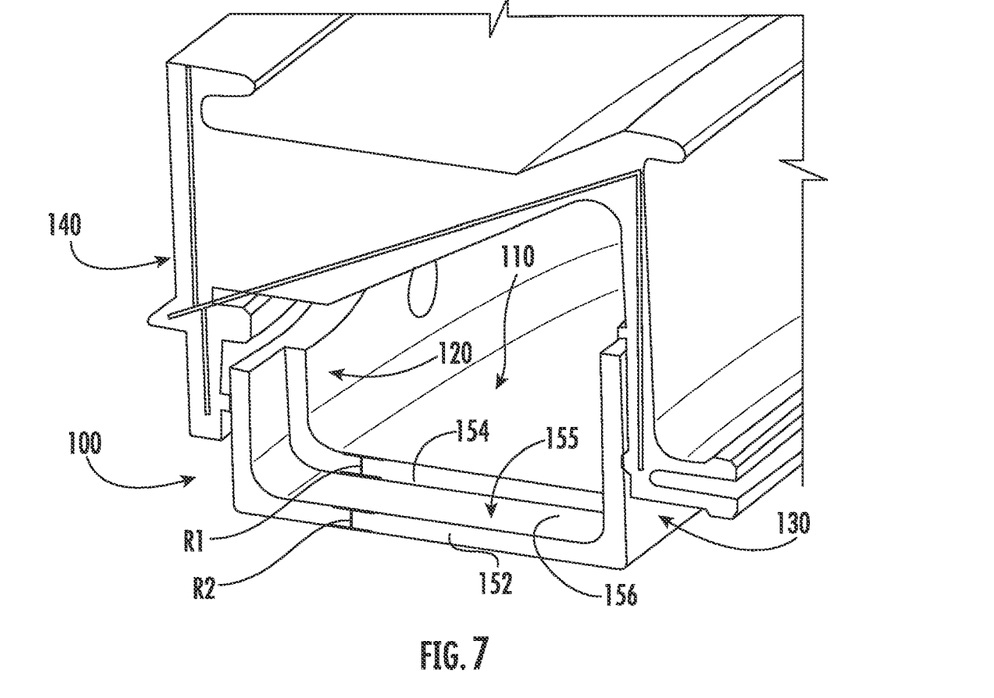
FIG. 7 is a perspective view of the turbine shroud segment and hanger of FIG. 2, as viewed from the first end.
Figure 8:
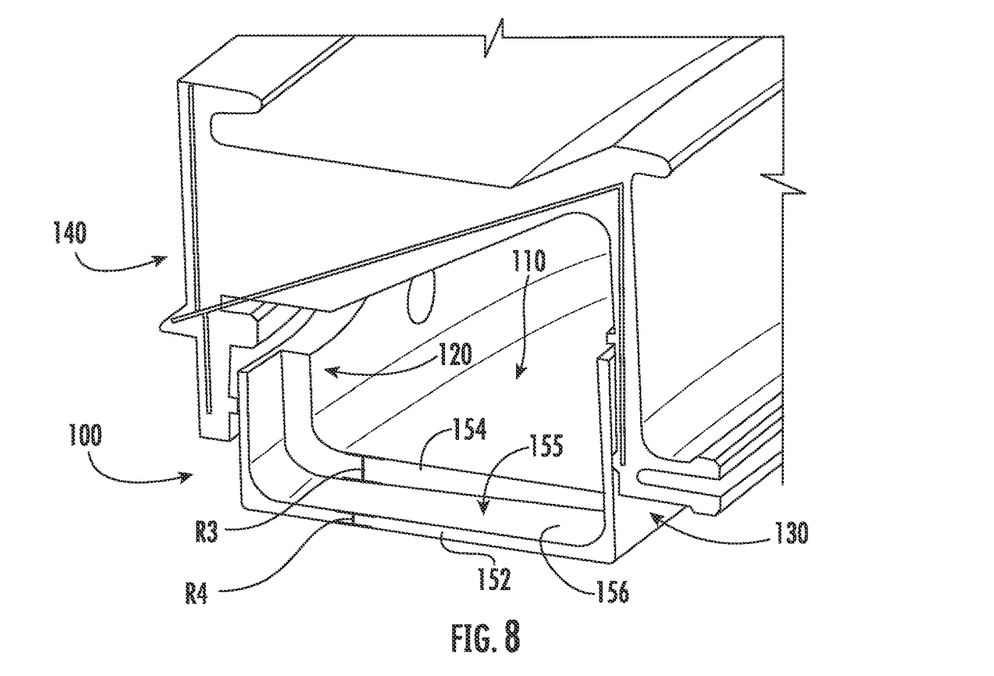
FIG. 8 is a perspective view of an alternate embodiment of the turbine shroud segment of FIG. 2, as positioned within the hanger of FIG. 2 and as viewed from the first end.

FIGS. 7 and 8 illustrate the present turbine shroud segment 100 within the hanger 140. As shown in FIG. 7, a radial distance R1 is defined between the radially outer (top) surface of the bottom panel 110 and the intermediate surface 156 of the recess 155. The distance R1 represents the height of the first end cutback face 154. A radial distance R2 is defined between the radially inner (bottom) surface of the bottom panel 110 and the intermediate surface 156 of the recess 155. The distance R2 represents the height of the first end face 152. In the illustrated embodiment, R1 is equal to R2. The same dimensions are present on the second end 160, although not separately illustrated.

As shown in FIG. 8, a radial distance R3 is defined between the radially outer (top) surface of the bottom panel 110 and the intermediate surface 156 of the recess 155. The distance R3 represents the height of the first end cutback face 154. A radial distance R4 is defined between the radially inner (bottom) surface of the bottom panel 110 and the intermediate surface 156 of the recess 155. The distance R4 represents the height of the first end face 152. In the illustrated embodiment, R4 is less than R3. The same dimensions are present on the second end 160, although not separately illustrated.

Although not separately illustrated, it should be recognized that, in an alternate embodiment, the radial distance R3 may be less than the radial distance R4 at each end 150, 160 of the shroud segment 100.

Figure 10:
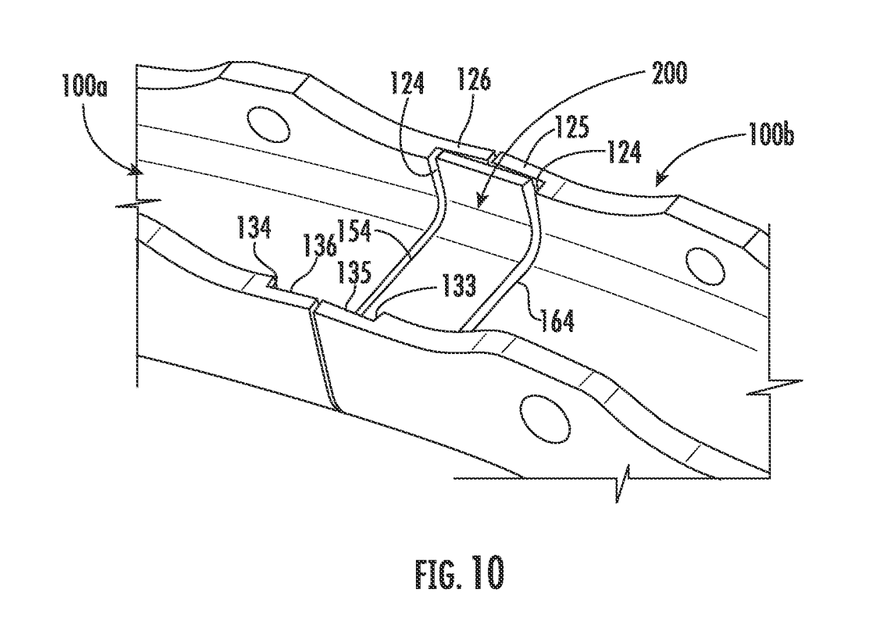
FIG. 10 is an overhead perspective view of the pair of turbine shroud segments of FIG. 9, in which a seal is installed, according to one aspect of the present disclosure.
Figure 11:
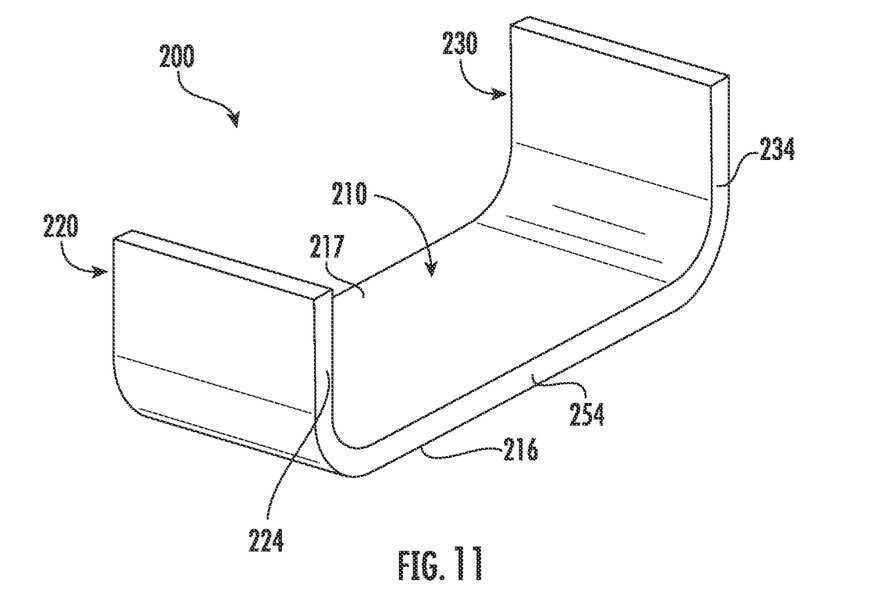
FIG. 11 is a perspective view of a single-piece seal, as may be used with the joint of FIG. 9.

FIGS. 9 and 10 illustrate the joint between the first end 150 of a first turbine shroud segment 100a and the second end 150 of an adjacent second turbine shroud segment 100b. As shown, the recess 165 of the second end 160 is aligned with the recess 255 of the first end 150, thereby forming a joint recess 170. As shown in FIG. 11, a metal seal 200 is placed within the joint recess 170, such that the seal 200 simultaneously overlaps both the first end 150 and the second end 160. As a result, the leakage between the turbine shrouds 100 is minimized. Because the ends 150, 160 are formed with recesses 155, 165 instead of with seal slots, the metal seal 200 may have a greater thickness than the seals conventionally used between turbine shroud segments (e.g., turbine shrouds 2), which improves the durability of the seal 200.

Figure 12:
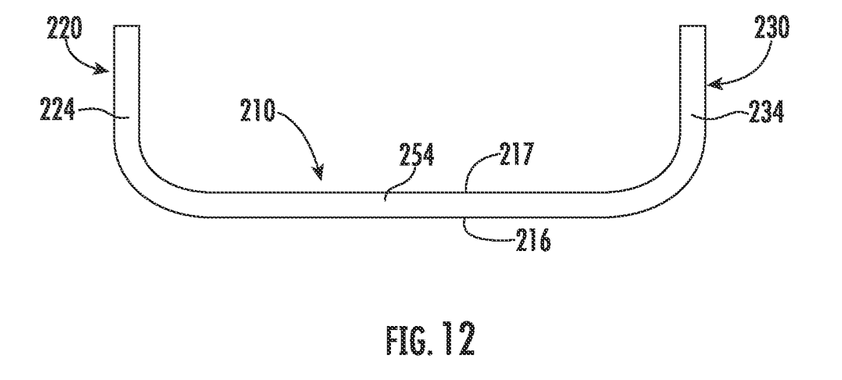
FIG. 12 is a side view of the single-piece seal of FIG. 11.

FIGS. 11 and 12 illustrate the metal seal 200, according to one aspect of the present disclosure. The metal seal 200 is a single-piece seal having a generally U-shaped profile, which includes a center portion 210, a first seal leg 220 extending radially outward from the center portion 210, and a second seal leg 230 extending radially outward from the center portion 210 opposite the first seal leg 220. The phrase "generally U-shaped" refers to a profile having a longer center portion 210, shorter seal legs 220, 230 at either end of the center portion 210, and a radius of curvature defined between the center portion 210 and each respective seal leg 220, 230. The center portion 210 includes a radially inner (bottom) surface 216 that contacts the recesses 155, 165, when the seal 200 is installed; a radially outer (top) surface 217 opposite the radially inner surface 216; and a center seal face 254 that extends radially between the radially inner surface 216 and the radially outer surface 217.

The seal leg 220 includes a seal leg face 224, and the seal leg 230 includes a seal leg face 234. Both seal leg faces 224, 234 are integral with the center seal face 254. When the seal 200 installed (as shown in FIG. 10), the seal leg face 224 on one side of the seal 200 contacts the first leg cutback face 124 of the first end 150 of the first shroud segment 100a, and the seal leg face 224 on the other side of the seal 200 contacts the first leg cutback face 123 of the second end 160 of the second shroud segment 100b. Similarly (although not visible in FIG. 10), the seal leg face 234 on one side of the seal 200 contacts the second leg cutback face 134 on the first end 150 of the first shroud segment 100a, and the seal leg face 234 on the other side of the seal 200 contacts the second leg cutback face 133 of the second end 160 of the second shroud segment 100b.

Although the seal 200 is illustrated as being symmetrical with seal legs 220, 230 of equal length, it should be understood that the seal leg 230 may be made longer than the seal leg 220 to better conform to the height of the second leg 130 of the shroud segment 100. A symmetrical seal 200 may be sufficient to achieve the desired degree of sealing while minimizing material costs and simplifying installation.

Figure 13:
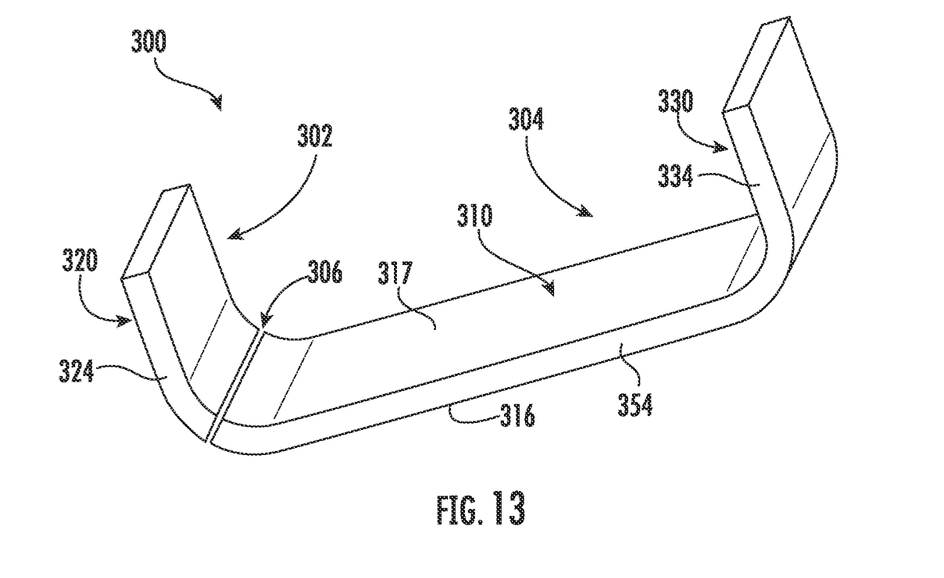
FIG. 13 is a perspective view of a two-piece seal, as may be used with the joint of FIG. 9.
Figure 14:
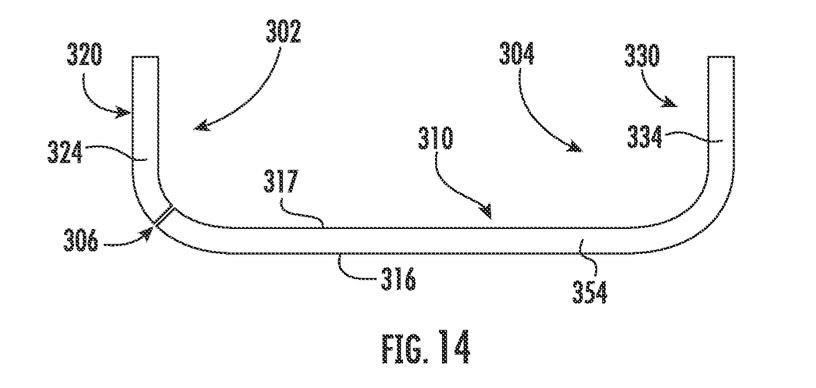
FIG. 14 is a side view of the two-piece seal of FIG. 13.

FIGS. 13 and 14 illustrate a metal seal 300, according to another aspect of the present disclosure. The metal seal 300 is a two-piece seal whose seal segments 302, 304 together produce a generally U-shaped profile. A first seal segment 302 includes a first seal leg 320 that interfaces with a second seal segment 304. The second seal segment 304 includes a center portion 310 and a second seal leg 330 extending radially outward from the center portion 310 opposite the first seal leg 320. The center portion 310 includes a radially inner (bottom) surface 316 that contacts the recesses 155, 165, when the seal 300 is installed; a radially outer (top) surface 317 opposite the radially inner surface 316; and a center seal face 354 that extends radially between the radially inner surface 316 and the radially outer surface 317.

The seal leg 320 of the first seal segment 302 includes a seal leg face 324, and the seal leg 330 of the second seal segment 304 includes a seal leg face 334. The seal leg face 334 is integral with the center seal face 354, and the seal leg face 324 of the first seal segment 302 is aligned with the center seal face 354. When the seal 300 installed (in place of the seal 200 of FIG. 10), the seal leg face 324 on one side of the seal segment 302 contacts the first leg cutback face 124 of the first end 150 of the first shroud segment 100a, and the seal leg face 324 on the other side of the seal segment 302 contacts the first leg cutback face 123 of the second end 160 of the second shroud segment 100b. Similarly (although not visible in FIG. 10), the seal leg face 334 on one side of the seal segment 304 contacts the second leg cutback face 134 on the first end 150 of the first shroud segment 100a, and the seal leg face 334 on the other side of the seal segment 304 contacts the second leg cutback face 133 of the second end 160 of the second shroud segment 100b.

A gap 306 may be formed at the corner of the U-shaped seal 300 between the first seal segment 302 and the second seal segment 304. The mating surfaces of the first seal segment 302 and the second seal segment 304 may be formed at any desired angle relative to one another and may or may not be parallel as shown.

Moreover, although the gap 306 is illustrated as being located at the corner of the U-shaped seal 300, it should be understood that the first seal segment 302 and the second seal segment 304 may be separated at some other location, as needs dictate.

Figure 15:
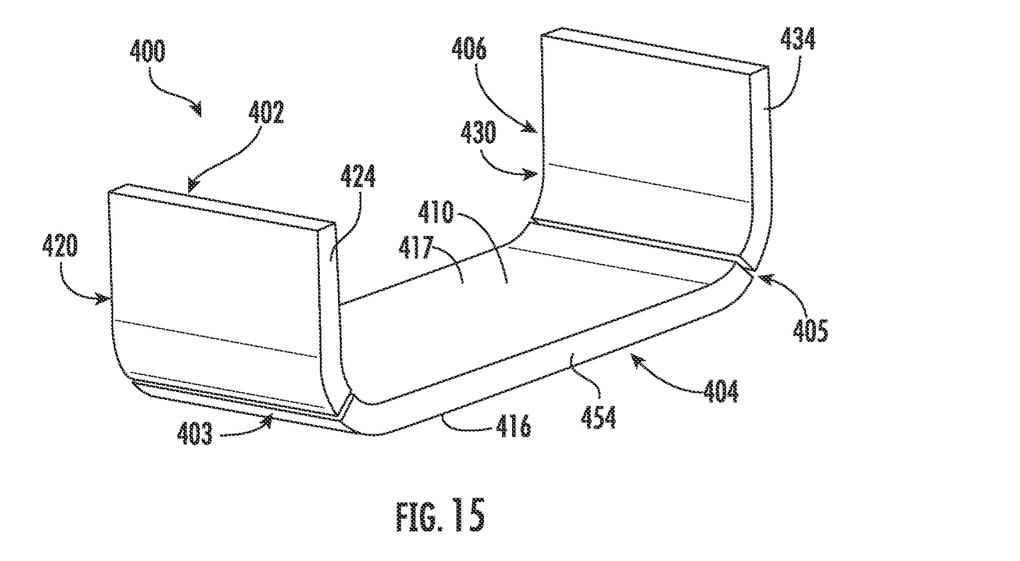
FIG. 15 is a perspective view of three-piece seal, as may be used with the joint of FIG. 9.
Figure 16:
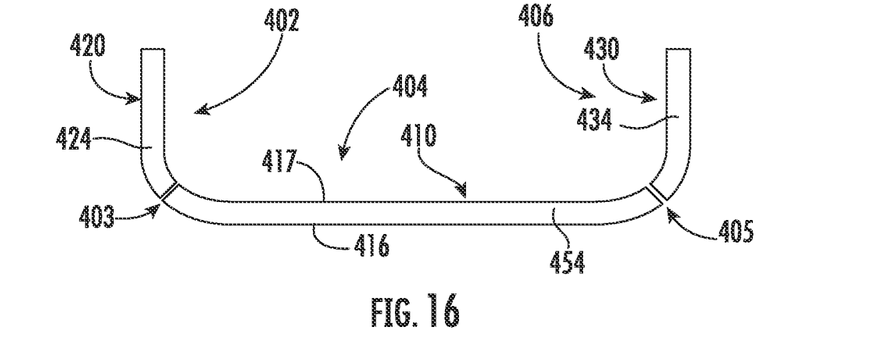
FIG. 16 is a side view of the three-piece seal of FIG. 15.

FIGS. 15 and 16 illustrate a metal seal 400, according to another aspect of the present disclosure. The metal seal 400 is a three-piece seal whose seal segments 402, 404, 406 together produce a generally U-shaped profile. A first seal segment 402 includes a first seal leg 320 that interfaces with a second seal segment 404. The second seal segment 404 includes a center portion 410 that interfaces with a third seal segment 406. The third seal segment 406 includes a second seal leg 430 extending radially outward relative to the center portion 410 opposite the first seal leg 420. The center portion 410 includes a radially inner (bottom) surface 416 that contacts the recesses 155, 165, when the seal 400 is installed; a radially outer (top) surface 417 opposite the radially inner surface 416; and a center seal face 454 that extends radially between the radially inner surface 416 and the radially outer surface 417.

The seal leg 420 of the first seal segment 402 includes a seal leg face 424, and the seal leg 430 of the third seal segment 406 includes a seal leg face 434. The seal leg face 424 of the first seal segment 402 and the seal leg face 434 of the third seal segment 406 are aligned with the center seal face 454. When the seal 400 installed (in place of the seal 200 of FIG. 10), the seal leg face 424 on one side of the first seal segment 402 contacts the first leg cutback face 124 of the first end 150 of the first shroud segment 100a, and the seal leg face 424 on the other side of the first seal segment 402 contacts the first leg cutback face 123 of the second end 160 of the second shroud segment 100b. Similarly (although not visible in FIG. 10), the seal leg face 434 on one side of the third seal segment 406 contacts the second leg cutback face 134 on the first end 150 of the first shroud segment 100a, and the seal leg face 434 on the other side of the third seal segment 406 contacts the second leg cutback face 133 of the second end 160 of the second shroud segment 100b.

Gaps 403, 405 may be formed at the corners of the U-shaped seal 400 between the first seal segment 402 and the second seal segment 404 and between the second seal segment 404 and the third seal segment 406, respectively. The mating surfaces of the first seal segment 402, the second seal segment 404, and the third seal segment 406 may be formed at any desired angle relative to one another and may or may not be parallel as shown.

Moreover, although the gaps 403,405 are illustrated as being located at the corners of the U-shaped seal 400, it should be understood that the first seal segment 402, the second seal segment 404, and the third seal segment 406 may be separated at other locations, as needs dictate.

The present turbine shroud segments may be made of metal superalloys. However, for higher temperature environments, it may be desirable to make the shroud segments from ceramic matrix composite materials. When made of ceramic matrix composite material, the sealing surfaces (i.e., end faces and cutback faces of the bottom panel and the legs) may be finished to the desired tolerance by machining and/or grinding. Additionally, the ceramic matrix composite shroud segments may be coated, and the coating may be ground to achieve the desired sealing tolerance.

Exemplary embodiments of the present turbine shroud segments are described above in detail. The turbine shroud segments described herein are not limited to the specific embodiments described herein, but rather, components of the turbine shroud segments may be utilized independently and separately from other components described herein. For example, the turbine shroud segments described herein may have other applications not limited to practice with turbines for power-generating gas turbines, as described herein.

While the technical advancements have been described in terms of various specific embodiments, those skilled in the art will recognize that the technical advancements can be practiced with modification within the spirit and scope of the claims.

What is claimed is:

1. A turbine engine comprising:
  a rotor comprising a plurality of stationary nozzles arranged in a first stage and an adjacent second stage; and
  a shroud disposed between the first stage and the adjacent second stage of the plurality of stationary nozzles, wherein the shroud comprises a plurality of arcuate shroud segments sealingly engaged with one another, the plurality of arcuate shroud segments including a first shroud segment and a second shroud segment circumferentially adjacent the first shroud segment;
  wherein each arcuate shroud segment of the plurality of arcuate shroud segments comprises a bottom panel, the bottom panel having a radially inner surface, a radially outer surface, a first end, and a second end;

wherein the first end comprises a first end face extending radially outward from the radially inner surface of the bottom panel, a first end cutback face circumferentially spaced from the first end face and extending radially inward from the radially outer surface of the bottom panel, and a first intermediate surface extending between the first end face and the first end cutback face to define a first recess;

wherein the second end comprises a second end face extending radially outward from the radially inner surface of the bottom panel, a second end cutback face circumferentially spaced from the second end face and extending radially inward from the radially outer surface of the bottom panel, and a second intermediate surface extending between the second end face and the second end cutback face to define a second recess;

wherein at least one seal is disposed within the first recess of the first arcuate shroud segment and the second recess of the second arcuate shroud segment to form a sealed joint;

wherein each arcuate shroud segment further comprises a first leg projecting radially outwardly from the bottom panel and a second leg projecting radially outwardly from the bottom panel opposite the first leg; and wherein the first leg and the second leg extend circumferentially between the first end and the second end.

2. The turbine engine of claim 1, wherein the at least one seal is one of a plurality of seals; and wherein the at least one seal is a single-piece seal having a generally U-shape.

3. The turbine engine of claim 1, wherein a first radial distance is defined between the intermediate surface of the first end and the radially outer surface, and a second radial distance is defined between the intermediate surface of the first end and the radially inner surface; and wherein the first radial distance is equal to the second radial distance.

4. The turbine engine of claim 1, wherein a first radial distance is defined between the intermediate surface of the first end and the radially outer surface, and a second radial distance is defined between the intermediate surface of the first end and the radially inner surface; and wherein the second radial distance is smaller than the first radial distance.

5. The turbine engine of claim 1, wherein a first circumferential distance is defined between the first end face and the first end cutback face, and a second circumferential distance is defined between the second end face and the second end cutback face; and wherein the first circumferential distance is equal to the second circumferential distance.

6. The turbine engine of claim 1,
wherein the first leg and the bottom panel intersect at a first edge, and the second leg and the bottom panel intersect at a second edge axially spaced from the first edge; and
wherein the bottom panel does not extend beyond the first leg or the second leg in an axial direction.

7. The turbine engine of claim 6, wherein, at the first end, the first leg includes a first leg face, a first leg cutback face, and a first leg intermediate surface extending circumferentially between the first leg face and the first leg cutback face;
wherein, at the first end, the second leg includes a second leg face, a second leg cutback face, and a second leg intermediate surface extending circumferentially between the second leg face and the second leg cutback face; and
wherein the first leg face and the second leg face are integral with the first end face of the bottom panel, the first leg cutback face and the second leg cutback face are integral with the first end cutback face of the bottom panel, and the first leg intermediate surface and the second leg intermediate surface are integral with the intermediate surface of the bottom panel.

8. The turbine engine of claim 7, wherein, at the second end, the first leg includes a third leg face, a third leg cutback face, and a third leg intermediate surface extending between the third leg face and the third leg cutback face;
wherein, at the second end, the second leg includes a fourth leg face, a fourth leg cutback face, and a fourth leg intermediate surface extending between the fourth leg face and the fourth leg cutback face; and
wherein the at least one seal simultaneously contacts the first leg intermediate surface at the first end of a first shroud segment and the third leg intermediate surface at the second end of a circumferentially adjacent shroud segment.

9. The turbine engine of claim 1, wherein the at least one seal comprises two seal segments.

10. The turbine engine of claim 9, wherein the two seal segments comprise a first seal segment having a generally L-shape and a second seal segment having a shape complementary to the first seal segment to define a U-shaped seal.

11. A turbine shroud disposed between adjacent stages of stationary turbine nozzles, the turbine shroud comprising:
a plurality of arcuate shroud segments sealingly engaged with one another, each arcuate shroud segment comprising a bottom panel, the bottom panel having a radially inner surface, a radially outer surface, a first end, and a second end;
wherein the first end comprises a first end face extending radially outward from the radially inner surface of the bottom panel, a first end cutback face circumferentially spaced from the first end face and extending radially inward from the radially outer surface of the bottom panel, and a first intermediate surface extending between the first end face and the first end cutback face to define a first recess;
wherein the second end comprises a second end face extending radially outward from the radially inner surface of the bottom panel, a second end cutback face circumferentially spaced from the second end face and extending radially inward from the radially outer surface of the bottom panel, and a second intermediate surface extending between the second end face and the second end cutback face to define a second recess;
a plurality of seals, wherein at least one seal disposed within the first recess and the second recess of each respective pair of adjacent arcuate shroud segments of the plurality of arcuate shroud segments;
wherein each arcuate shroud segment further comprises a first leg projecting radially outwardly from the bottom panel and a second leg projecting radially outwardly from the bottom panel opposite the first leg; and
wherein the first leg and the second leg extend circumferentially between the first end and the second end.

12. The turbine shroud of claim 11, wherein the at least one seal is a single-piece seal having a generally U-shape.

13. The turbine shroud of claim 11, wherein a first radial distance is defined between the intermediate surface of the first end and the radially outer surface, and a second radial distance is defined between the intermediate surface of the first end and the radially inner surface; and wherein the second radial distance is equal to or smaller than the first radial distance.

14. The turbine shroud of claim 11, wherein a first circumferential distance is defined between the first end face and the first end cutback face, and a second circumferential distance is defined between the second end face and the second end cutback face;

and wherein the first circumferential distance is equal to the second circumferential distance.

15. The turbine shroud of claim 11, wherein the first leg and the bottom panel intersect at a first edge, and the second leg and the bottom panel intersect at a second edge axially spaced from the first edge; and wherein the bottom panel does not extend beyond the first leg or the second leg in an axial direction.

16. The turbine shroud of claim 11, wherein, at the first end, the first leg includes a first leg face, a first leg cutback face, and a first leg intermediate surface extending circumferentially between the first leg face and the first leg cutback face; wherein, at the first end, the second leg includes a second leg face, a second leg cutback face, and a second leg intermediate surface extending circumferentially between the second leg face and the second leg cutback face; and wherein the first leg face and the second leg face are integral with the first end face of the bottom panel, the first leg cutback face and the second leg cutback face are integral with the first end cutback face of the bottom panel, and the first leg intermediate surface and the second leg intermediate surface are integral with the intermediate surface of the bottom panel.

17. The turbine shroud of claim 16, wherein, at the second end, the first leg includes a third leg face, a third leg cutback face, and a third leg intermediate surface extending between the third leg face and the third leg cutback face;

wherein, at the second end, the second leg includes a fourth leg face, a fourth leg cutback face, and a fourth leg intermediate surface extending between the fourth leg face and the fourth leg cutback face; and wherein the at least one seal simultaneously contacts the first leg intermediate surface at the first end of a first shroud segment and the third leg intermediate surface at the second end of a circumferentially adjacent shroud segment.

18. The turbine shroud of claim 15, wherein the at least one seal comprises two seal segments.

19. The turbine shroud of claim 18, wherein the two seal segments comprise a first seal segment having a generally L-shape and a second seal segment having a shape complementary to the first seal segment to define a U-shaped seal.

* * * * *